(12) United States Patent
Kuge et al.

(10) Patent No.: US 10,677,979 B2
(45) Date of Patent: Jun. 9, 2020

(54) LIGHT GUIDE PLATE AND SURFACE-LIGHTING DEVICE

(71) Applicant: KAWASAKI JUKOGYO KABUSHIKI KAISHA, Kobe-shi (JP)

(72) Inventors: Morimasa Kuge, Kobe (JP); Takanori Kritoshi, Kobe (JP); Osami Oogushi, Kobe (JP); Hideyuki Tanaka, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 16/094,185

(22) PCT Filed: Apr. 19, 2017

(86) PCT No.: PCT/JP2017/015757
§ 371 (c)(1),
(2) Date: Oct. 16, 2018

(87) PCT Pub. No.: WO2017/183661
PCT Pub. Date: Oct. 26, 2017

(65) Prior Publication Data
US 2019/0137680 A1 May 9, 2019

(30) Foreign Application Priority Data
Apr. 22, 2016 (JP) .................................. 2016-086507

(51) Int. Cl.
*F21V 8/00* (2006.01)
*F21K 9/61* (2016.01)
(Continued)

(52) U.S. Cl.
CPC .............. *G02B 6/0045* (2013.01); *F21K 9/61* (2016.08); *G02B 6/002* (2013.01);
(Continued)

(58) Field of Classification Search
CPC .......... F21K 9/61; G02B 6/002; G02B 6/0051
See application file for complete search history.

(56) References Cited

U.S. PATENT DOCUMENTS

2004/0130912 A1 7/2004 Miyashita
2009/0086466 A1 4/2009 Sugita et al.
(Continued)

FOREIGN PATENT DOCUMENTS

JP 2004-200093 7/2004
JP 2009-21158 1/2009
(Continued)

*Primary Examiner* — Joseph L Williams
*Assistant Examiner* — Jacob R Stern
(74) *Attorney, Agent, or Firm* — Fay Kaplun & Marcin, LLP

(57) ABSTRACT

A light guide plate includes an incidence surface and an output surface. The incidence surface is an end surface on which light emitted from a light source is incident. The output surface is a surface from which incident light coming from the incidence surface is outputted, and is a plane orthogonal to a thickness direction. The incidence surface is at least partially curved toward the light source, when viewed in a cross-section cut along a plane parallel to both a thickness direction of the light guide plate and an arrangement direction in which the light source and the light guide plate are arranged.

7 Claims, 11 Drawing Sheets

(51) Int. Cl.
*F21Y 103/10* (2016.01)
*F21Y 111/00* (2016.01)
*F21Y 115/10* (2016.01)

(52) U.S. Cl.
CPC ........ *F21Y 2103/10* (2016.08); *F21Y 2111/00* (2013.01); *F21Y 2115/10* (2016.08); *G02B 6/0051* (2013.01); *G02B 6/0055* (2013.01)

(56) References Cited

U.S. PATENT DOCUMENTS

| | | |
|---|---|---|
| 2009/0201675 A1 | 8/2009 | Onishi et al. |
| 2013/0038817 A1 | 2/2013 | Hirayama et al. |
| 2016/0341866 A1* | 11/2016 | Guo ................. G02B 6/002 |

FOREIGN PATENT DOCUMENTS

| | | |
|---|---|---|
| JP | 2009-81079 | 4/2009 |
| WO | 2011/135907 | 11/2011 |

* cited by examiner

Fig. 1
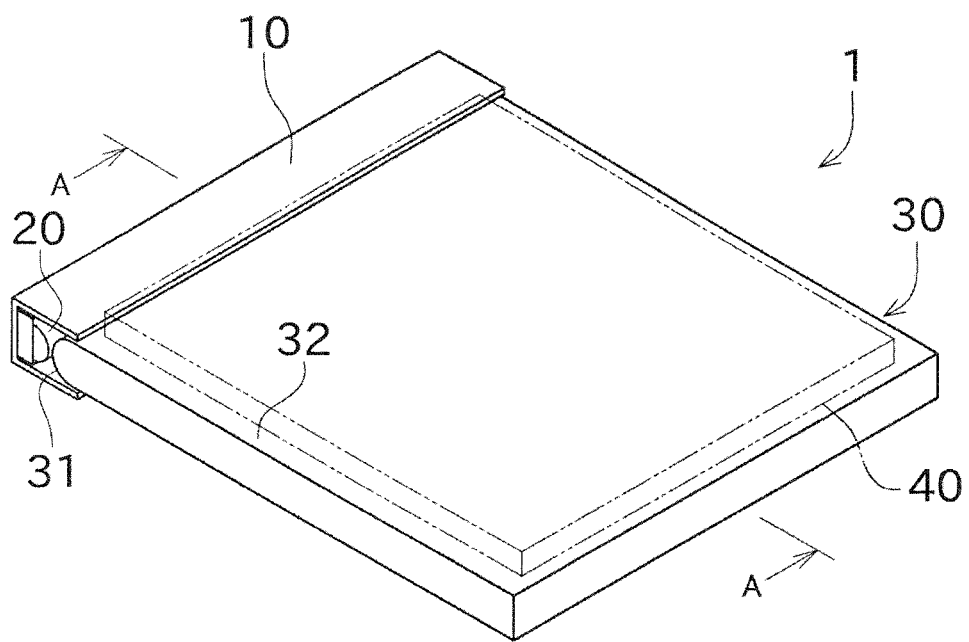
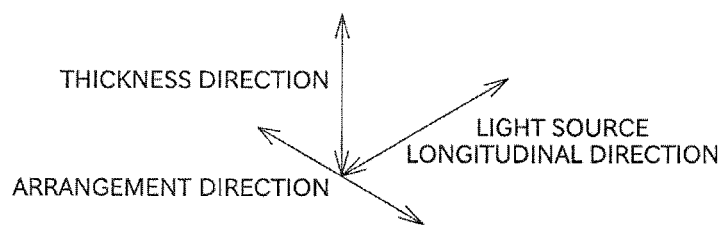

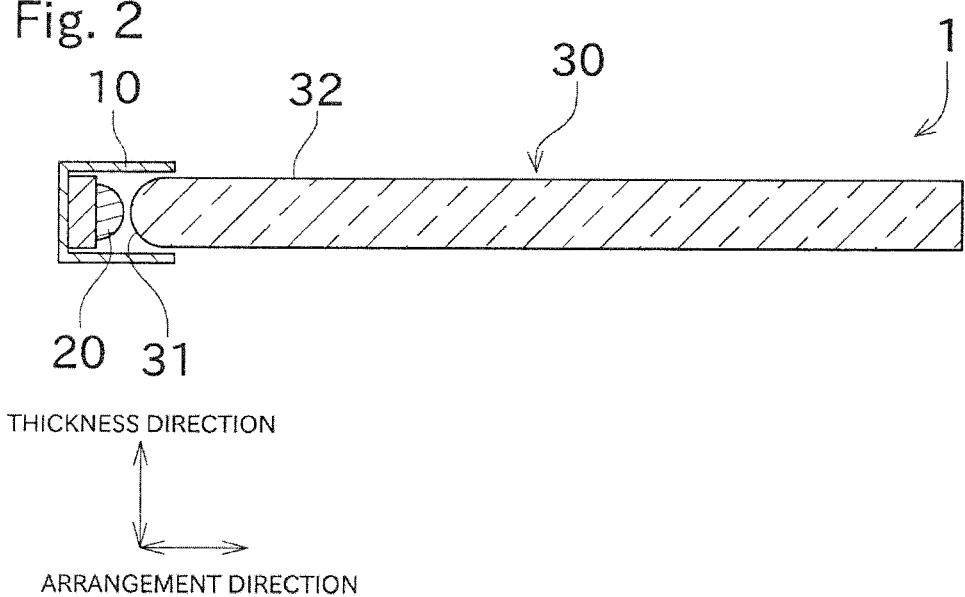

Fig. 5(a)     PRIOR ART
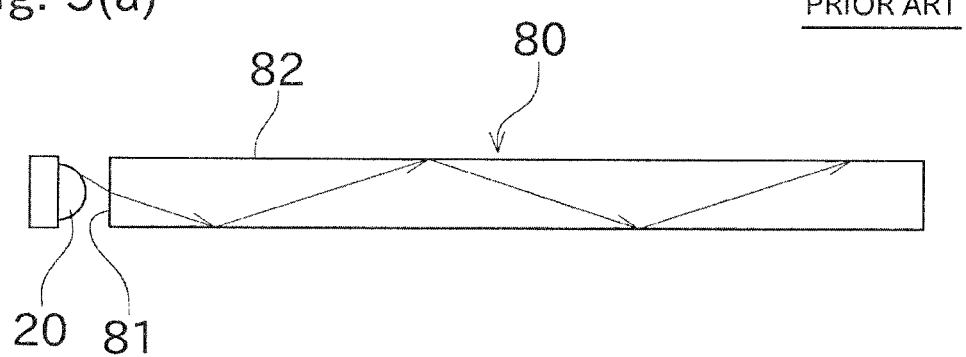
Fig. 5(b)     PRESENT EMBODIMENT
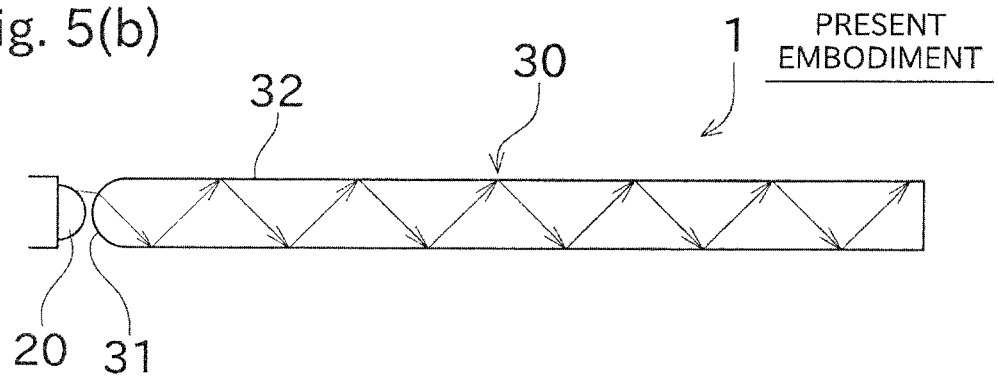

Fig. 6(a)  PRIOR ART
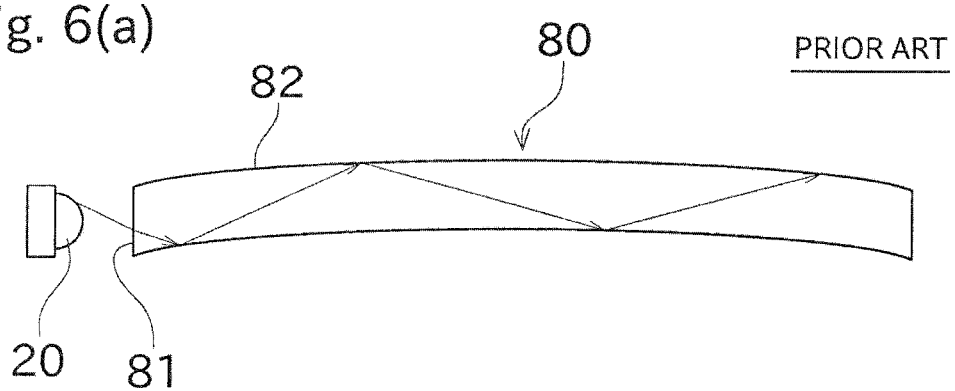
Fig. 6(b)  FIRST VARIATION
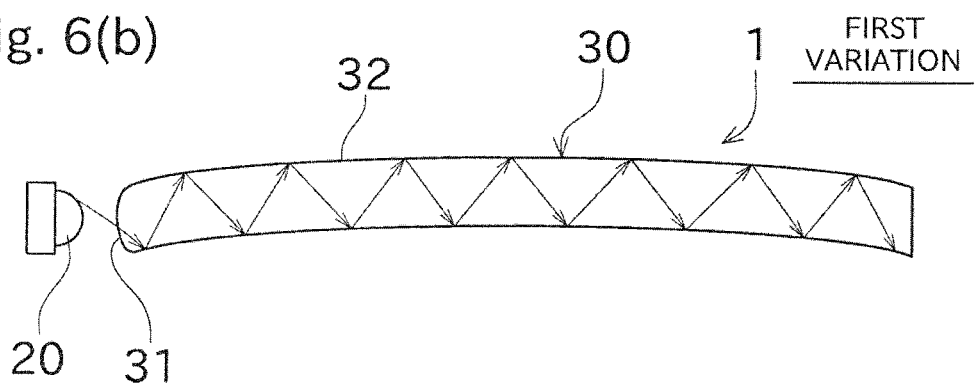

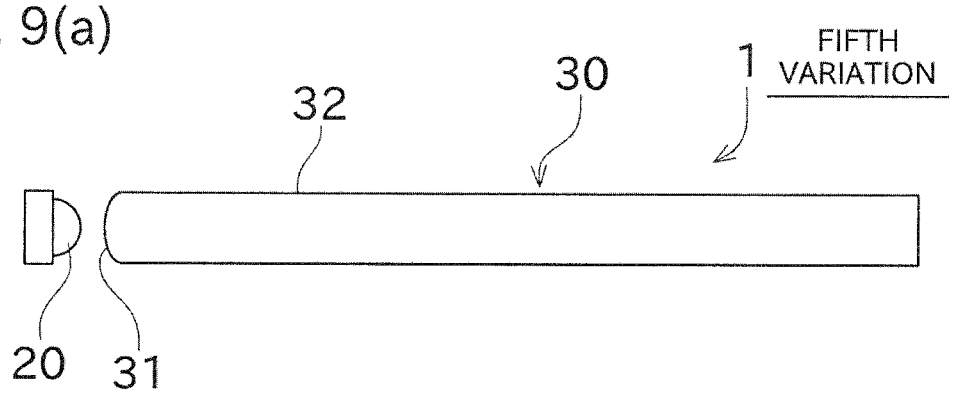
Fig. 9(a) FIFTH VARIATION
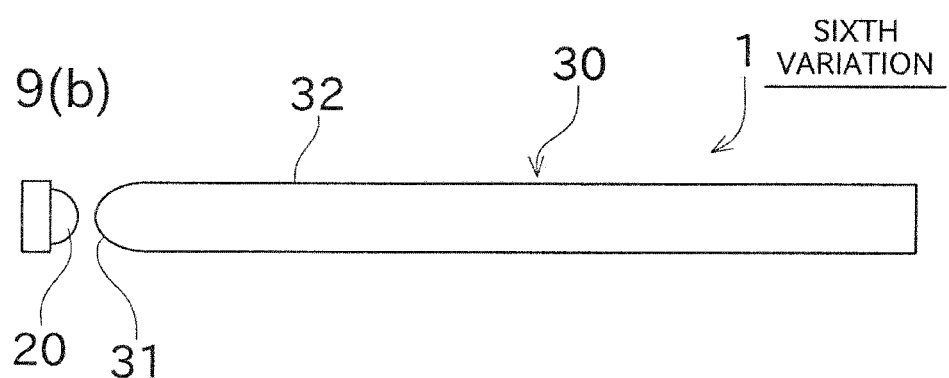
Fig. 9(b) SIXTH VARIATION
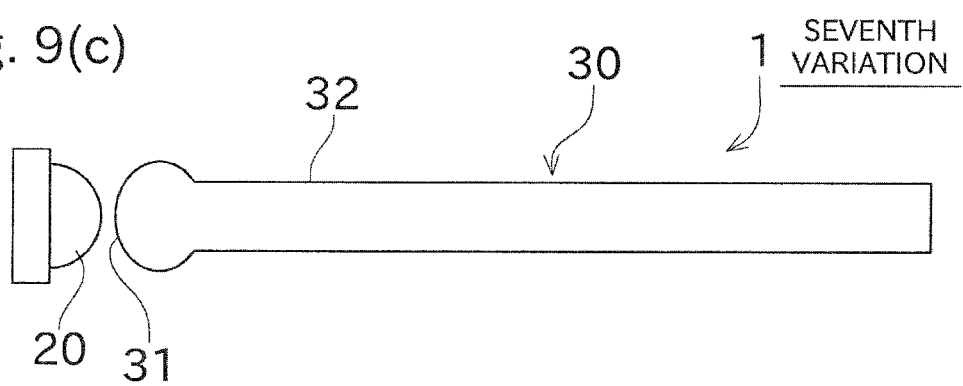
Fig. 9(c) SEVENTH VARIATION

TENTH VARIATION

LIGHT GUIDE PLATE AND SURFACE-LIGHTING DEVICE

TECHNICAL FIELD

The present invention relates mainly to a light guide plate included in a surface-lighting device of edge-lighting type.

BACKGROUND ART

A surface-lighting device of edge-lighting type includes a light source and a light guide plate. The light source emits light to an end surface (side surface) of the light guide plate. The light emitted to the light guide plate is, while reflected within the light guide plate, uniformly outputted from another surface (output surface). By merely emitting light to the side surface of the light guide plate, the entire output surface can be made luminous. Patent Literature 1 (PTL 1) discloses a surface-lighting device of edge-lighting type.

PTL 1 discloses a surface-lighting device configured such that light emitted from a light source is reflected by a reflection member and then is incident on a light guide plate. According to PTL 1, a concave mirror can be used as the reflection member.

CITATION LIST

Patent Literature

PTL 1: WO2012/070331

SUMMARY OF INVENTION

Technical Problem

In the configuration shown in PTL 1, however, it is necessary to adjust positions of three components, namely, the light source, the reflection member, and the light guide plate. A risk that an optical path in the light guide plate may largely change arises when positioning of any of the light source, the reflection member, and the light guide plate is less accurate due to, for example, mispositioning during assemblage or a temperature change. The risk that the optical path in the light guide plate may largely change also arises when the shape of the reflection member or the light guide plate is less accurate. This results in a non-uniform light output from an output surface.

The present invention relates to a light guide plate having an output surface with a high uniformity of illumination.

The present invention provides a light guide plate configured as follows. The light guide plate includes an incidence surface and an output surface. The incidence surface is an end surface on which light from a light source is incident. The output surface is a surface from which incident light coming from the incidence surface is outputted, and is a plane orthogonal to a thickness direction. The incidence surface is at least partially curved toward the light source, when viewed in a cross-section cut along a plane parallel to both a thickness direction of the light guide plate and an arrangement direction in which the light source and the light guide plate are arranged.

This enables light incident on the incidence surface to be taken into the light guide plate with a traveling direction of the light being regulated. In addition, an optical path of the light taken through the incidence surface is changed toward a center with respect to the thickness direction, and therefore the number of times reflection occurs within the light guide plate increases. Accordingly, the uniformity of illumination of the output surface can be improved.

In addition, the present invention provides a surface-lighting device including the light guide plate and a light source that emits light to the incidence surface of the light guide plate.

This enables the output surface to be uniformly luminous without any need to dispose a light concentrator or the like between the light source and the light guide plate.

One of advantages of the present invention is that it can provide a light guide plate having an output surface with a high uniformity of illumination.

BRIEF DESCRIPTION OF DRAWINGS

FIG. 1 shows a perspective view showing a configuration of a surface-lighting device according to an embodiment of the present invention.

FIG. 2 shows a cross-sectional view of the surface-lighting device as taken along A-A.

FIGS. 5(a) and 5(b) show cross-sectional views schematically showing a difference between an optical path in the light guide plate according to this embodiment and an optical path in the light guide plate according to the conventional example.

FIGS. 6(a) and 6(b) show cross-sectional views schematically showing a difference between a bendable light guide plate (first variation) and the light guide plate according to the conventional example.

FIGS. 9(a), 9(b) and 9(c) show cross-sectional views showing light guide plates (according to fifth to seventh variations) each having an incidence surface in the shape of an elliptical arc.

DESCRIPTION OF EMBODIMENTS

Figure 3A:
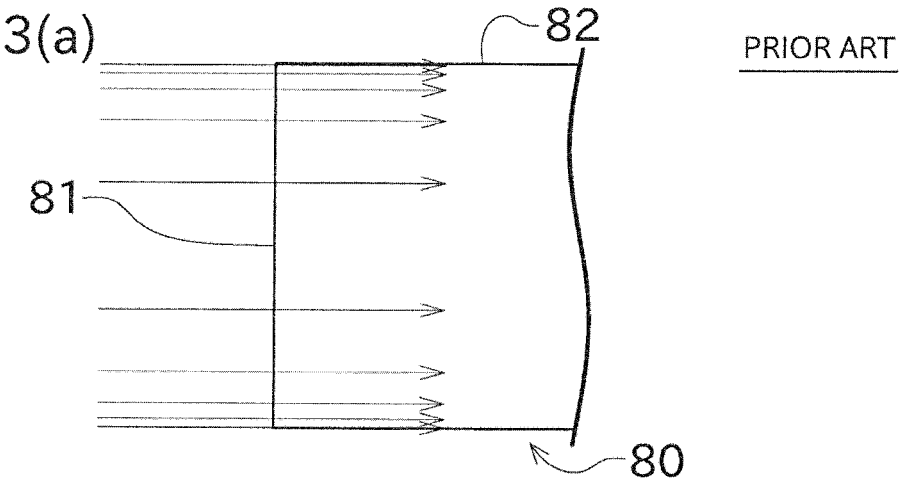
FIGS. 3(a), 3(b) and 3(c) show cross-sectional views of a light guide plate according to a conventional example, showing changes of optical paths obtained when parallel light rays (horizontal), parallel light rays (inclined), and light rays focusing to one point are emitted to the light guide plate.

An embodiment of the present invention will now be described with reference to the drawings. First, referring to FIG. 1 and FIG. 2, a configuration of a surface-lighting device 1 will be described. FIG. 1 is a perspective view showing a configuration of the surface-lighting device 1 according to an embodiment of the present invention. FIG. 2 is a cross-sectional view of the surface-lighting device 1 as taken along A-A.

As shown in FIG. 1, the surface-lighting device 1 includes a light source holder 10, a light source 20, and a light guide plate 30. In the following description, a thickness direction of a light guide plate may be simply referred to as a thickness direction, and a direction in which the light source 20 and the light guide plate 30 are arranged may be simply referred to as an arrangement direction. A direction perpendicular to both the thickness direction and the arrangement direction will be referred to as a light source longitudinal direction.

The light source 20 includes a plurality of light-emitting elements (in this embodiment, light-emitting diodes) disposed along the light source longitudinal direction. Thus, the light source 20 is able to emit light to an object, i.e., the light guide plate 30, throughout the light guide plate 30 in the light source longitudinal direction. The light source 20 may include something other than light-emitting diodes. For example, the light source 20 may be a CCFL (cold cathode fluorescent lamp), a HCFL (hot cathode fluorescent lamp), or an EL (electroluminescent device). The configuration of the light source 20 is not limited to an arrangement of point light sources, and may be an arrangement of line light sources.

The light source holder 10 is configured such that the light source 20 is attachable thereto. The light source holder 10 is disposed so as to cover a space between the light source 20 and the light guide plate 30, and at least an inner surface of the light source holder 10 is made of a material capable of reflecting light. Due to this configuration, light emitted from the light source 20 is partially reflected by the inner surface of the light source holder 10, and is incident on the light guide plate 30. This can reduce a loss of the light emitted from the light source 20.

In this embodiment, the light guide plate 30 is a rectangular plate-shaped member. The light guide plate 30 may be made of any material as long as the material is light-transmissive. The material may be a resin such as an acrylic resin or a polycarbonate resin, or may be glass. As shown in FIG. 1, the light guide plate 30 has an incidence surface 31 and an output surface 32.

The incidence surface 31 is a side surface (end surface) of the light guide plate 30, which in other words is a surface parallel to the thickness direction (and also parallel to the light source longitudinal direction), or is a surface including a portion parallel to the thickness direction. The light guide plate 30 is disposed such that the incidence surface 31 is opposed to the light source 20 (in other words, such that a longitudinal direction of the incidence surface 31 is coincident with the light source longitudinal direction and such that a position of the light source 20 and a position of the incidence surface 31 with respect to the longitudinal direction are coincident with each other). With this configuration, light emitted from the light source 20 is incident on the substantially entire incidence surface 31 and inputted into the light guide plate 30.

As shown in FIG. 1 and FIG. 2, the incidence surface 31 is a curved surface. To be specific, in FIG. 2 (showing a cross-section cut along a plane parallel to both the thickness direction and the arrangement direction, or a cross-section cut along a plane orthogonal to the light source longitudinal direction), the incidence surface 31 is curved toward the light source 20. In this embodiment, the incidence surface 31 is in the shape of a circular arc (a circular sector having a central angle of 180°) whose radius of curvature is ½ of a plate thickness of the light guide plate 30.

The incidence surface 31 with the shape of a curved surface can be formed by a machine work such as cutting or grinding, or can be formed with use of a mold. Alternatively, the incidence surface 31 can be formed by: melting an end surface of the light guide plate 30 and using a surface tension to make the end surface become a curved surface; and in this state, cool a resultant. Preferably, a surface of the incidence surface 31 is flat to such a degree that a light traveling direction is not disturbed upon incidence on the incidence surface 31. Advantages of the incidence surface 31 with the shape of a curved surface will be described later.

The output surface 32 is a surface of the light guide plate 30 (a surface perpendicular to the thickness direction, a surface including a portion perpendicular to the thickness direction, a surface having the largest area, or a principal plane). Light incident on the incidence surface 31 travels to an end surface (a right end surface in FIG. 2) opposite to the incidence surface 31 while being reflected within the light guide plate 30. In the course of the traveling, the light is outputted from the output surface 32 to the outside. This configuration enables substantially the whole of the output surface 32 to be luminous.

The surface-lighting device 1 of this embodiment is used as a backlight for a liquid crystal panel 40, as shown in FIG. 1. The liquid crystal panel 40 includes, for example, a liquid crystal layer, a color filter, a glass substrate, a polarizing film, and the like. With this configuration, just emitting light to the incidence surface 31 enables the liquid crystal panel to be uniformly irradiated with light.

To obtain a more uniform light output from the output surface 32, a diffusion sheet may be disposed between the light guide plate 30 and the liquid crystal panel 40. For the same purpose, a surface of the output surface 32 may have grooves, recesses, or protrusions. To prevent light from being outputted from a surface opposite to the output surface 32, the surface may be provided with a reflection sheet or a reflection plate.

Although the light guide plate 30 shown in FIG. 1 is in the shape of a rectangular plate, it may be in the shape of a square or other polygonal plate or in the shape of a circular plate. The light guide plate 30 is not limited to a flat plate, and may be a curved plate. In a case where the light guide plate 30 is a curved plate, the output surface 32 has a curved shape. Although the surface-lighting device 1 shown in FIG. 1 is configured to emit light to one end surface of the light guide plate 30, a configuration that emits light to two or more end surfaces is also acceptable. In addition, a configuration that emits light to a part of the incidence surface 31 is also acceptable as long as light is uniformly outputted from the output surface 32.

Referring to FIGS. 3(a), 3(b), 3(c), 4(a), 4(b), 4(c), 5(a) and 5(b), advantages of a configuration in which the incidence surface 31 is curved toward the light source 20 will be described in comparison with a light guide plate 80 according to a conventional example. In cross-sectional views of FIGS. 3(a), 3(b), and 3(c) and subsequent figures, hatching is omitted for making the figures easy to see.

Figure 3B:
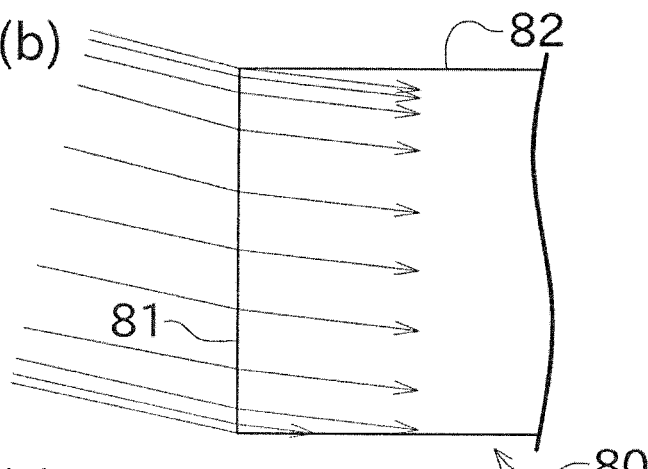
Figure 3C:
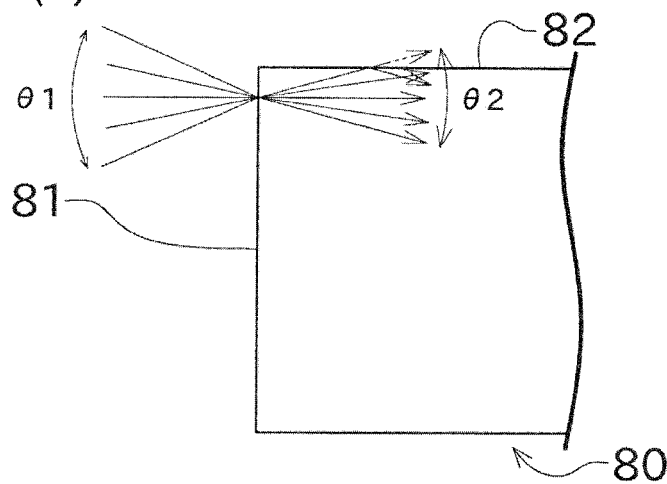

As shown in FIGS. 3(a), 3(b), and 3(c), the light guide plate 80 of the conventional example has an end surface that is planar (linear in the cross-sections of FIGS. 3(a), 3(b), and 3(c)). Like the light guide plate 30, the light guide plate 80 has an incidence surface 81 and an output surface 82.

The light source 20 emits light rays in various traveling directions. The traveling directions are further changed upon the light rays being reflected by the inner surface of the light source holder 10. Thus, light rays in all traveling directions are incident on the incidence surface 31.

FIG. 3(a) shows changes of light traveling directions obtained when parallel light rays that are parallel to the output surface 82 are incident on the incidence surface 81 of the light guide plate 80 of the conventional example. When the parallel light rays that are parallel to the output surface 82 are incident on the light guide plate 80 of the conventional example, the light traveling directions are not changed. These light rays, therefore, are not outputted from the output surface 82.

Figure 4A:
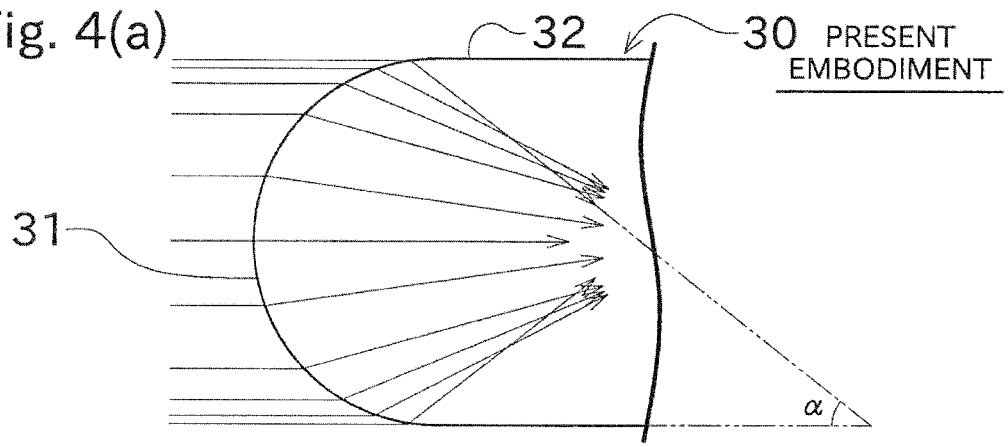
FIGS. 4(a), 4(b) and 4(c) show cross-sectional views of a light guide plate according to this embodiment, showing changes of optical paths obtained when parallel light rays (horizontal), parallel light rays (inclined), and light rays focusing to one point are emitted to the light guide plate.

FIG. 4(a) shows changes of light traveling directions obtained when parallel light rays that are parallel to the output surface 32 are incident on the incidence surface 31 of the light guide plate 30 of this embodiment. In the light guide plate 30 of this embodiment, the parallel light rays that are parallel to the output surface 32 pass through the incidence surface 31, and thereby their traveling directions are changed so as to be directed toward the inner side of the light guide plate 30 (toward the center with respect to the thickness direction). Thus, even when incident light rays are parallel to the output surface 32, these light rays are reflected within the light guide plate 80 during traveling, and therefore a part of the light rays is outputted from the output surface 32. Thus, effective use of the light of the light source 20 can be made. A light ray that is incident on an end portion of the incidence surface 31 with respect to the thickness direction is at an angle α (see FIG. 4(a)) relative to the output surface 32. Given that the light guide plate 30 is made of glass, this light ray is totally reflected, even at the angle α.

FIG. 3(b) shows changes of light traveling directions obtained when parallel light rays that are inclined relative to the output surface 82 are incident on the incidence surface 81 of the light guide plate 80 of the conventional example. In the light guide plate 80 of the conventional example, the light traveling directions are changed such that their inclination angles relative to the output surface 82 are made smaller. As the inclination angles relative to the output surface 82 are smaller, the number of times reflection occurs within the light guide plate 80 decreases as shown in FIG. 5(a), which raises a risk that light outputted from the output surface 82 may be non-uniform.

Figure 4B:
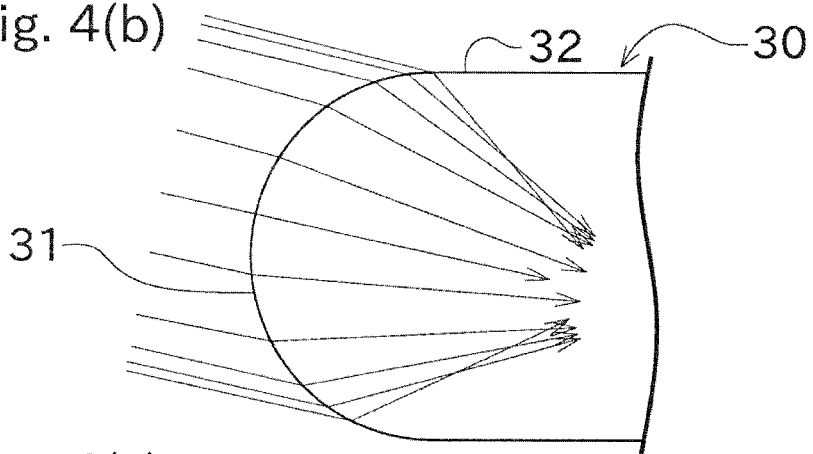

FIG. 4(b) shows changes of light traveling directions obtained when parallel light rays that are inclined relative to the output surface 32 are incident on the incidence surface 31 of the light guide plate 30 of this embodiment. In the light guide plate 30 of this embodiment, the parallel light rays that are inclined relative to the output surface 32 pass through the incidence surface 31, and thereby their traveling directions are changed such that they are displaced toward the inner side of the light guide plate 30 (such that their inclination angles relative to the output surface 32 are made larger). As the inclination angles relative to the output surface 32 are larger, the number of times reflection occurs within the light guide plate 30 increases as shown in FIG. 5(b), which enables light outputted from the output surface 82 to be more uniform, FIG. 3(c) shows changes of light traveling directions obtained when light rays focusing to one point on the incidence surface 81 are incident on the incidence surface 81. An angle θ1 represents a spread of light before the light is incident on the incidence surface 81. An angle θ2 represents a spread of light after the light is incident on the incidence surface 81. In the light guide plate 80 of the conventional example, a relationship of θ1>θ2 is established because of a difference in refractive index between air and the light guide plate 80.

Figure 4C:
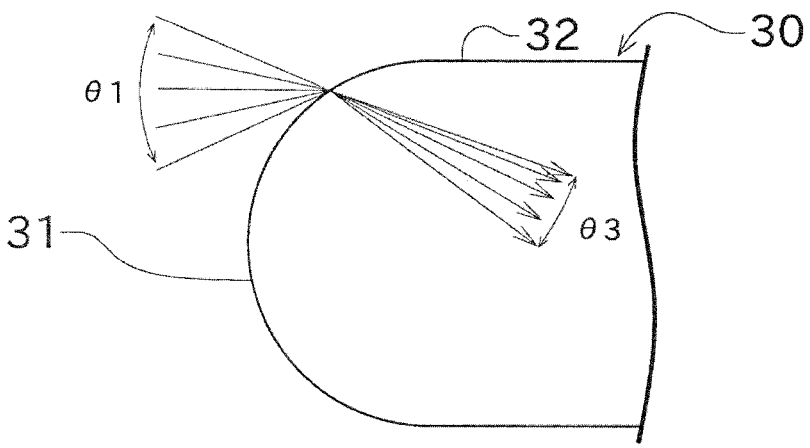

FIG. 4(c) shows changes of light traveling directions obtained when light rays focusing to one point on the incidence surface 31 are incident on the incidence surface 31. An angle θ1 represents a spread of light before the light is incident on the incidence surface 31. An angle θ3 represents a spread of light after the light is incident on the incidence surface 31. A relationship of θ1>θ2>θ3 is established. In this embodiment, even when such light rays are incident, their traveling directions are changed such that their inclination angles relative to the output surface 32 are made larger. In this manner, light rays in various directions can be changed in such a direction that their inclination angles relative to the output surface 32 are made larger, and therefore the number of times reflection occurs within the light guide plate 30 increases, which enables light outputted from the output surface 82 to be more uniform.

The light guide plate 80 of the conventional example requires a detailed optical path design, one reason of which is that light does not reflect much within the light guide plate 80. For such designing, the positions and shapes of the light source 20 and the light guide plate 80 need to be highly accurate. In this respect, the light guide plate 80 of this embodiment, in which light rays in various directions can be changed in such a direction that their inclination angles relative to the output surface 32 are made larger, enables the output surface 32 to be uniformly luminous even if there is a slight mispositioning or misshaping.

A first variation of the embodiment described above will now be described with reference to FIGS. 5(a) and 5(b). In descriptions of variations, members identical or similar to those of the embodiment described above will be given the same reference signs on the drawings, and their descriptions may be omitted.

In the embodiment described above, the light guide plate 30 is made of glass or the like, and has no flexibility. In the first variation, the light guide plate 30 is made of a resin composition such as silicone rubber, urethane rubber, or an acrylic resin, and has a flexibility.

In the light guide plate 80 of the conventional example, as mentioned above, light does not reflect much within the light guide plate 80, and therefore a detailed optical path design is made to arrange components with a high positioning accuracy so that light can be uniformly outputted from the output surface 82. In this configuration, however, merely slight bending of the light guide plate 80 causes a change in a light incidence angle, which causes a change of a reflection direction, resulting in a change of an optical path within the light guide plate 80. This makes it impossible to uniformly emit light from the output surface 82 (see FIG. 6(a)).

In the light guide plate 30 of the first variation, on the other hand, light rays in various directions can be changed in such a direction that their inclination angles relative to the output surface 32 are made larger. It therefore is possible that the output surface 32 is uniformly luminous, even though the light guide plate 80 is bent (see FIG. 6(b)).

Although the light guide plate 30 of the first variation has a flexibility, the present invention is applicable also to a light guide plate 30 (a curved light guide plate) that is bent and that has no flexibility.

Figure 7A:
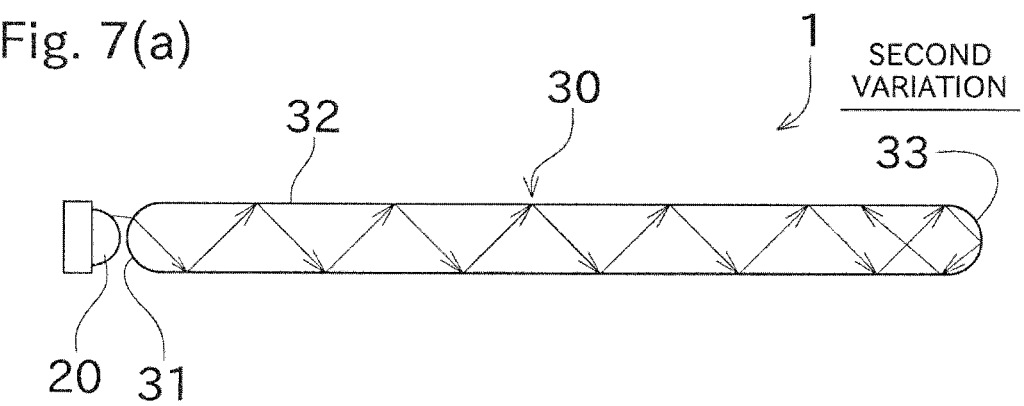
FIGS. 7(a) and 7(b) show cross-sectional views showing a configuration of a light guide plate (second variation) having a reflective surface.

A second variation of the embodiment described above will now be described with reference to FIGS. 7(a) and 7(b).

In the embodiment described above, the end surface opposite to the incidence surface 31 is linear, and a reflection plate, a reflection sheet, or the like are not provided. In the second variation, as shown in FIG. 7(a), an end surface (reflective surface 33) opposite to the incidence surface 31 is provided with a reflection plate which is capable of reflecting light incident thereon from the inside of the light guide plate 30. The reflective surface 33 is a curved surface curved toward the side opposite to the incidence surface 31. In other words, the reflective surface 33 is curved outward when viewed in a cross-section cut along a plane parallel to both the thickness direction and the arrangement direction.

Figure 7B:
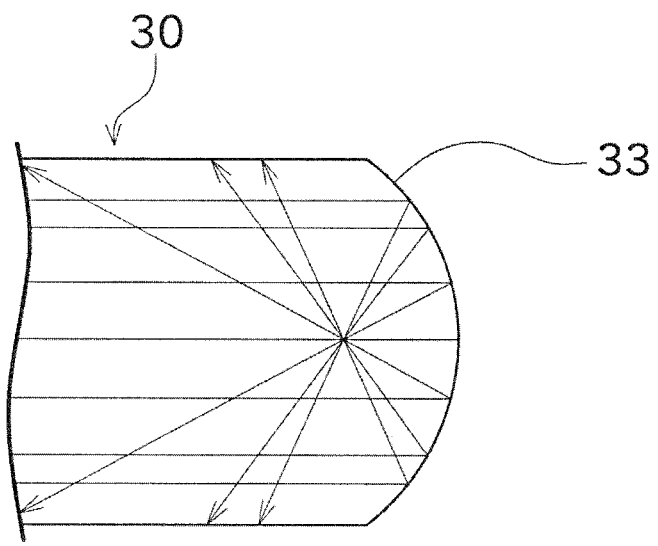

With this configuration, light rays in various directions coming from the inside of the light guide plate 30 can be reflected in such a direction that their inclination angles relative to the output surface 32 are made larger, as shown in FIG. 7(b). As a result, the output surface 32 can be made uniformly luminous. In addition, the reflective surface 33 does not allow leakage of light, and thus efficient use of light emitted from the light source 20 can be made.

A third variation and a fourth variation will now be described with reference to FIGS. 8(a) and 8(b).

In the embodiment described above, the incidence surface 31 has a circular arc shape whose radius of curvature is ½ of the plate thickness, when viewed in a cross-section cut along a plane parallel to both the thickness direction and the arrangement direction. In the third and fourth variations, on the other hand, the incidence surface 31 has a circular arc shape whose radius of curvature is larger than ½ of the plate thickness (convex-curve), when viewed in the same cross-section (FIGS. 8(a) and 8(b)). Here, the convex-curve represents such a shape that a plate end portion has a substantially spherical curved surface so that the light guide plate 30 as a whole has a spoon-like shape. This configuration contributes to an increased surface area of the incidence surface 31, and thus allows an increased amount of light to be taken into the light guide plate 30 as compared to the embodiment described above. As a result, the output surface 32 can be made brightly luminous. In particular, even when the size (thickness length) of the light source 20 is larger than the plate thickness of the light guide plate, the incidence surface 31 according to the third and fourth variations is able to take in a sufficient amount of light of the light source 20.

Figure 8A:
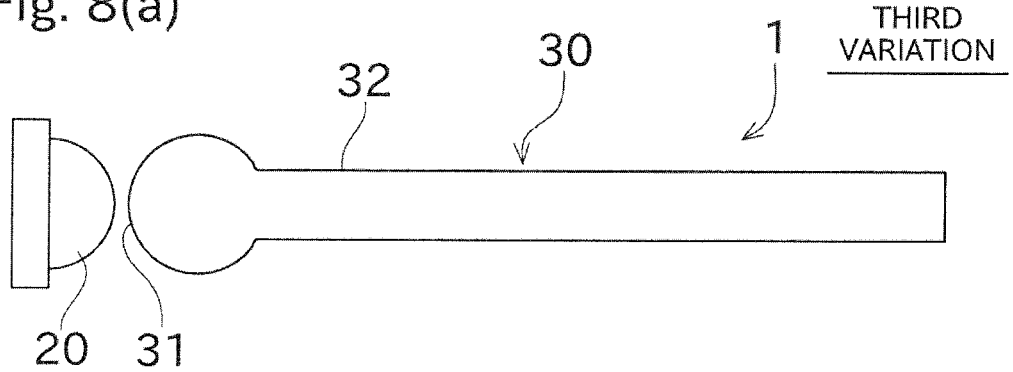
FIGS. 8(a) and 8(b) show cross-sectional views showing light guide plates (according to a third variation and a fourth variation) each having an incidence surface whose radius of curvature is greater than ½ of a plate thickness (convex curve).
Figure 8B:
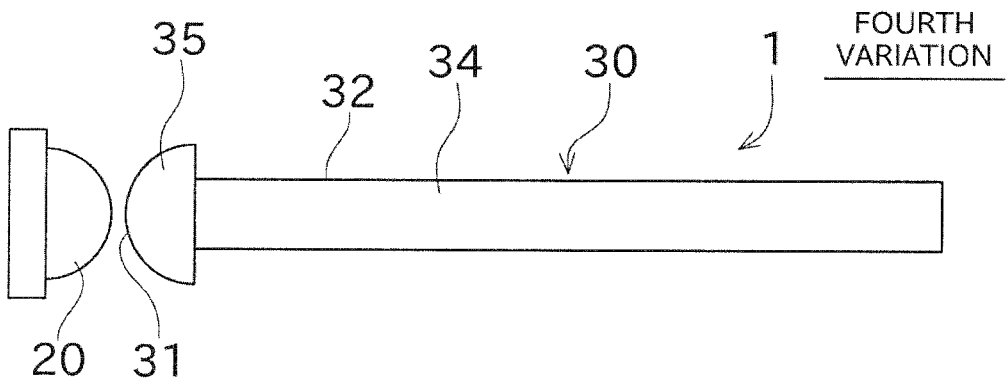

In the light guide plate 30 according to the third variation of FIG. 8(a), an end portion of the light guide plate 30 is worked to form the incidence surface 31, for example. There is no boundary between a circular arc shaped portion and a flat plate shaped portion. In the light guide plate 30 according to the fourth variation of FIG. 8(b), a semicircular columnar end surface portion 35 (whose cross-sectional contour is in the shape of a circular sector, or whose contour is partially in the shape of a circular arc) and a flat plate shaped light guide plate main body 34 (whose cross-sectional contour is in the shape of a rectangular) are joined to each other. The end surface portion 35, which is joined to the light guide plate main body 34, is a part constituting the light guide plate 30, and therefore can exert the same advantageous effects.

Fifth to seventh variations will now be described with reference to FIGS. 9(a), 9(b) and 9(c).

In the embodiment and variations described above, the incidence surface 31 has a circular arc shape in a cross-sectional view. In the fifth to seventh variations, the incidence surface 31 has an elliptical arc shape in a cross-sectional view. More specifically, in the fifth variation, the length of the major axis of an ellipse is equal to the plate thickness, and the length of the minor axis thereof is shorter than the plate thickness. In the sixth variation, the length of the minor axis of an ellipse is equal to the plate thickness, and the length of the major axis thereof is longer than the plate thickness. In the seventh variation, the length of the major axis of the ellipse is longer than the plate thickness.

The incidence surface 31 is simply required to be curved toward the light source 20 in a cross-sectional view, and may have any curved shape other than circular arcs and elliptical arcs.

Figure 10A:
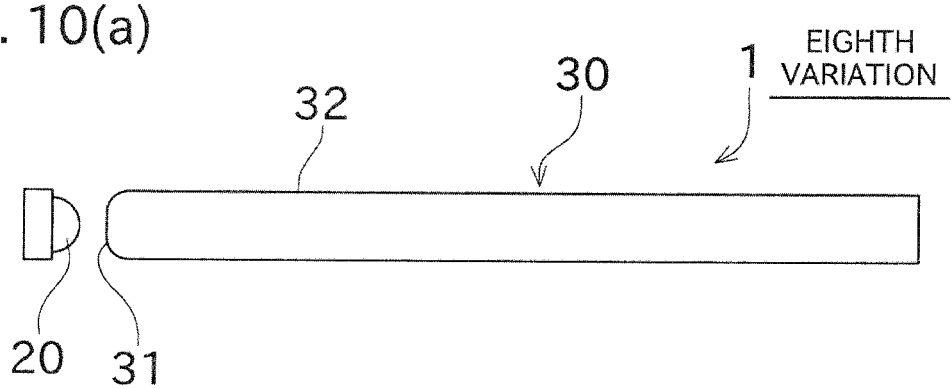
FIGS. 10(a) and 10(b) show cross-sectional views showing light guide plates (according to eighth and ninth variations) each having an incidence surface that is partially curved.
Figure 10B:
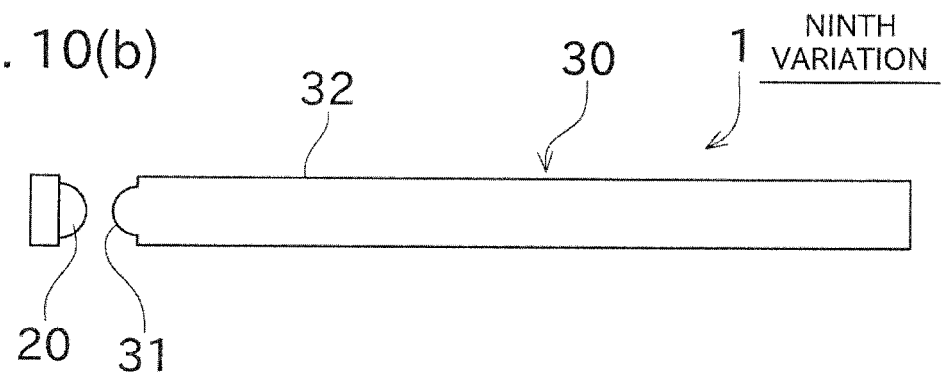

Eighth and ninth variations will now be described with reference to FIGS. 10(a) and 10(b).

In the embodiment and variations described above, the whole of the incidence surface 31 is curved in a cross-sectional view. In the eighth and ninth variations, a part of the incidence surface 31 is curved in a cross-sectional view. More specifically, in the eighth variation, end portions of the incidence surface 31 with respect to the thickness direction are curved (curved toward the light source 20), and a middle portion of the incidence surface 31 with respect to the thickness direction is linear (linear along the thickness direction), in a cross-sectional view. In the ninth variation, end portions of the incidence surface 31 with respect to the thickness direction are linear (linear along the thickness direction), and a middle portion of the incidence surface 31 with respect to the thickness direction is curved (curved toward the light source 20), in a cross-sectional view.

Figure 11:
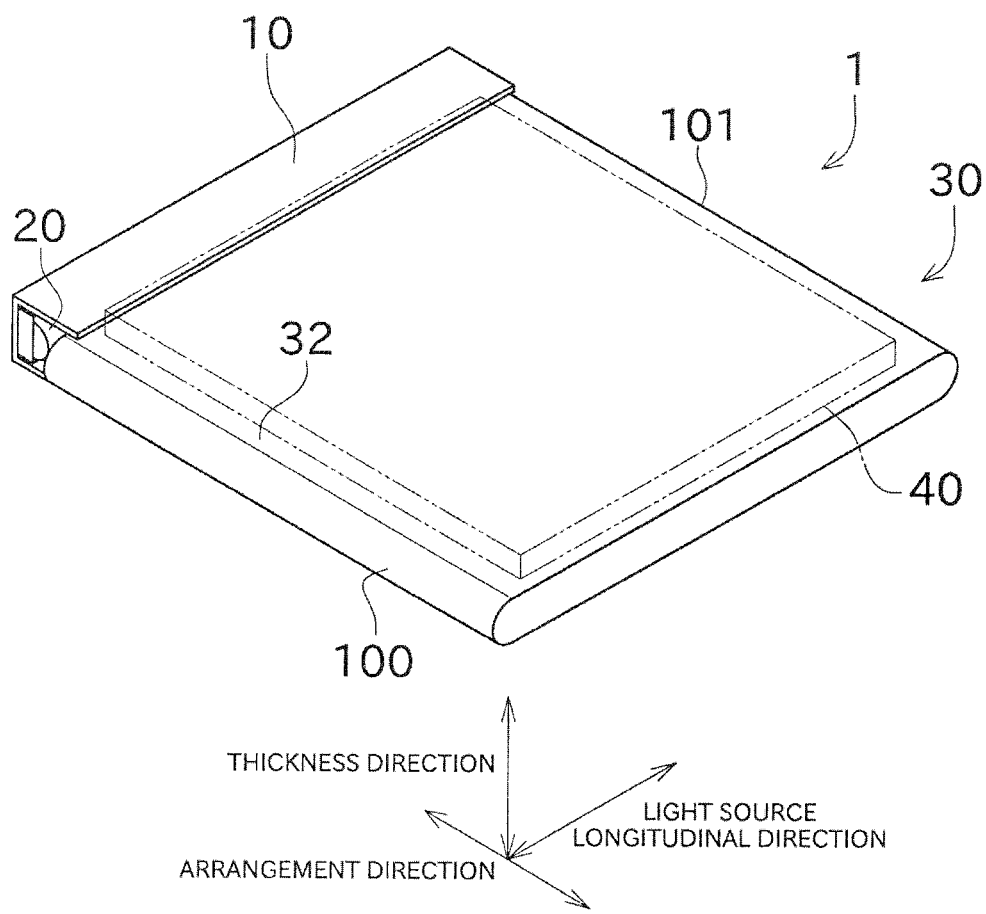
FIG. 11 shows a perspective view showing a light guide plate (according to a tenth variation) having curved side surfaces.

A tenth variation will now be described with reference to FIG. 11.

In the embodiment and variations described above, side surfaces (surfaces perpendicular to the light source longitudinal direction, or surfaces extending in the arrangement direction) of the light guide plate 30 except the incidence surface 31 and the reflective surface 33 are flat surfaces. In the tenth variation, as shown in FIG. 11, such side surface 100 and side surface 101 are curved surfaces. More specifically, each of the side surfaces 100, 101 is, similarly to the incidence surface 31 or the like, configured to have a circular arc shape when viewed in a cross-section (a cross-section cut along a plane orthogonal to the arrangement direction). Here, the side surfaces 100, 101 are simply required to have cross-sections that are curved to protrude outward in the light source longitudinal direction, and the cross-sections may not necessarily be circular arcs. For example, shapes illustrated in other variations, such as elliptical arcs, may be adoptable.

Similarly to the second variation, each of the side surfaces 100, 101 is provided with a reflection plate or the like, and is capable of reflecting light incident thereon from the inside of the light guide plate 30. Accordingly, incident light coming from the incidence surface 31, which then travels from the inside of the light guide plate 30 toward the outside through the side surfaces 100, 101, can be returned to the inside of the light guide plate 30.

With this configuration, similarly to the second variation, light rays in various directions coming from the inside of the light guide plate 30 can be reflected in such a direction that their inclination angles relative to the output surface 32 are made larger. As a result, the output surface 32 can be made uniformly luminous.

While some variations have been described above, features of the variations can be combined as appropriate. For example, the first variation can be combined with at least one of the second to tenth variations (the same is true for the second and subsequent variations). To be specific, the light guide plate 30 having a flexibility (first variation) may be provided with the reflective surface 33 (second variation). A combination of the second variation and the tenth variation makes light leakage from the light guide plate 30 less likely to occur, thus enabling the output surface 32 to be more uniformly luminous.

As thus far described, the light guide plate 30 has the incidence surface 31 and the output surface 32. The incidence surface 31 is the end surface on which light from the light source 20 is incident. The output surface 32 is a surface from which incident light coming from the incidence surface 31 is outputted, and is a plane orthogonal to the thickness direction. The incidence surface 31 is at least partially curved toward the light source 20, when viewed in a cross-section cut along a plane parallel to both the thickness direction of the light guide plate 30 and the arrangement direction in which the light source 20 and the light guide plate 30 are arranged.

This enables light rays incident on the incidence surface 31 to be taken into the light guide plate 30 with traveling directions of the light rays being regulated. Furthermore, optical paths of the light rays taken through the incidence surface 31 are changed toward the center with respect to the thickness direction, and therefore the number of times reflection occurs within the light guide plate 30 increases, which can improve the uniformity of illumination of the output surface 32.

In a cross-sectional view of the light guide plate 30 described above, the curve of the incidence surface 31 has a circular arc shape or an elliptical arc shape.

The incidence surface 31 can be formed with a simple shape, it is easy to design optical paths, manufacture the light guide plate 30, and the like.

In a cross-sectional view of the light guide plate 30 described above, the whole of the incidence surface 31 is curved toward the light source 20.

This allows an increased amount of light to be incident on the curved surface, so that the advantageous effects of the present invention can be exerted more effectively.

In the light guide plate 30 described above, the end surface opposite to the incidence surface 31 is provided with the reflective surface 33 capable of reflecting incident light coming from the incidence surface 31 toward the inside of the light guide plate 30. In a cross-sectional view of the light guide plate 30, the reflective surface 33 is at least partially curved toward the side opposite to the incidence surface 31.

Accordingly, even though light taken through the incidence surface 31 reaches the reflective surface 33, the light is reflected toward the inside of the light guide plate 30, which enables effective use of the light emitted from the light source 20. In particular, the reflective surface 33 having the above-described shape is able to change optical paths of reflected light rays toward the center with respect to the thickness direction with traveling directions of the reflected light rays being regulated, in the same manner as the incident light rays. Consequently, the uniformity of illumination of the output surface 32 can be improved.

The light guide plate 30 described above is configured such that the output surface 32 is at least partially bent, or such that the light guide plate 30 is bendable.

In a case of the output surface 32 being bent, just a slight error causes a large change of optical paths. In a case of the light guide plate 30 being bendable, bending the light guide plate 30 causes a large change of optical paths. These features, therefore, make it difficult that the output surface 32 is uniformly luminous. In this embodiment, it is possible to make the output surface 32 uniformly luminous even with the light guide plate 30 having such a configuration, because the number of times reflection occurs within the light guide plate 30 is large.

While a preferred embodiment and variations of the present invention have been described above, the configurations described above may be modified, for example, as follows.

In the embodiment and variations described above, the incidence surface 31 is directly irradiated with light emitted from the light source 20. Alternatively, irradiation of the incidence surface 31 may be conducted with interposition of a mirror or the like. Even with such a configuration, the surface-lighting device 1 of this embodiment, which is not required to have as high a positioning accuracy as PTL 1, enables light to be uniformly outputted from the output surface 32.

In the embodiment and variations described above, the incidence surface 31 is symmetrical about a line passing through the center of the incidence surface 31 with respect to the thickness direction, but instead, the incidence surface 31 may be asymmetrical.

The embodiment described above illustrates an example case where the surface-lighting device 1 is applied to a backlight of a liquid crystal display. The surface-lighting device 1 may be applicable to other purposes. For example, the surface-lighting device 1 is applicable to a backlight of a guidance display, a poster, or the like. Applications of the surface-lighting device 1 are not limited to backlights.

REFERENCE SIGNS LIST 1 surface-lighting device
10 light source holder
20 light source
30 light guide plate
31 incidence surface
32 output surface
33 reflective surface

The invention claimed is:

1. A light guide plate, comprising:
an incidence surface that is an end surface on which light from a light source is incident; and
an output surface that is a surface from which incident light coming from the incidence surface is outputted, the output surface being a plane orthogonal to a thickness direction,
wherein the incidence surface is at least partially curved toward the light source, when viewed in a cross-section cut along a plane parallel to both a thickness direction of the light guide plate and an arrangement direction in which the light source and the light guide plate are arranged,
wherein an end surface opposite to the incidence surface is provided with a reflective surface that reflects incident light coming from the incidence surface toward inside of the light guide plate,
wherein in the cross-section view, the reflective surface is at least partially curved toward a side opposite to the incidence surface, and
wherein the reflective surface is provided with one of a reflection plate and a reflection sheet that is capable of reflecting light incident thereon from the inside of the light guide plate.

2. The light guide plate according to claim 1, wherein in the cross-sectional view, the curve of the incidence surface has a circular arc shape or an elliptical arc shape.

3. The light guide plate according to claim 1, wherein in the cross-sectional view, a whole of the incidence surface is curved toward the light source.

4. The light guide plate according to claim 1, wherein in the cross-sectional view, the output surface is at least partially bent or bendable.

5. The light guide plate according to claim 1, further comprising:

two side surfaces extending in the arrangement direction,
wherein in the cross-sectional view, the two side surfaces are at least partially curved toward an outward of the light guide plate.

6. A surface-lighting device, comprising:
a light guide plate including an incidence surface that is an end surface on which light from a light source is incident; and an output surface that is a surface from which incident light coming from the incidence surface is outputted, the output surface being a plane orthogonal to a thickness direction, wherein the incidence surface is at least partially curved toward the light source, when viewed in a cross-section cut along a plane parallel to both a thickness direction of the light guide plate and an arrangement direction in which the light source and the light guide plate are arranged; and
a light source emitting light to the incidence surface of the light guide plate,
wherein an end surface opposite to the incidence surface is provided with a reflective surface that reflects incident light coming from the incidence surface toward inside of the light guide plate,
wherein in the cross-section view, the reflective surface is at least partially curved toward a side opposite to the incidence surface, and
wherein the reflective surface is provided with one of a reflection plate and a reflection sheet that is capable of reflecting light incident thereon from the inside of the light guide plate.

7. The surface-lighting device according to claim 6, further comprising:
two side surfaces extending in the arrangement direction,
wherein in the cross-sectional view, the two side surfaces are at least partially curved toward an outward of the light guide plate.

* * * * *